USO08688677B2

(12) United States Patent  
Jaffe et al.

(10) Patent No.: US 8,688,677 B2  
(45) Date of Patent: Apr. 1, 2014

(54) SEARCH-HIGHLIGHTER SYSTEM AND METHOD

(75) Inventors: Bruce Jaffe, Yarrow Point, WA (US); Brian Smith, Issaquah, WA (US)

(73) Assignee: Digiting, Inc., Seattle, WA (US)

( * ) Notice: Subject to any disclaimer, the term of this patent is extended or adjusted under 35 U.S.C. 154(b) by 248 days.

(21) Appl. No.: 13/112,660

(22) Filed: May 20, 2011

(65) Prior Publication Data

US 2011/0289066 A1 Nov. 24, 2011

Related U.S. Application Data

(60) Provisional application No. 61/346,848, filed on May 20, 2010.

(51) Int. Cl.  
*G06F 17/30* (2006.01)

(52) U.S. Cl.  
USPC ........................ 707/706; 707/765; 707/766

(58) Field of Classification Search  
USPC .......... 707/705, 707, 765, 766, 767, 999.003, 707/706  
See application file for complete search history.

(56) References Cited

U.S. PATENT DOCUMENTS 6,691,106 B1 * 2/2004 Sathyanarayan ...... 707/999.003  
7,353,246 B1 * 4/2008 Rosen et al. ............. 707/999.01

* cited by examiner

*Primary Examiner* — Vincent F Boccio  
(74) *Attorney, Agent, or Firm* — Æ ON Law; Adam L. K. Philipp

(57) ABSTRACT

A text string may be captured when a user initiates a selection event in a web browser. In response to the selection event, the text string is derived from the selected element(s) in a rendered web page. The text string is automatically placed in a web-search text-entry field of the web browser without further instructions from the user. The user can modify the text string before querying a web-search engine.

21 Claims, 5 Drawing Sheets

SEARCH-HIGHLIGHTER SYSTEM AND METHOD

CROSS-REFERENCE TO RELATED APPLICATIONS

This application claims the benefit of priority to U.S. Provisional Application No. 61/346,848, filed May 20, 2010, titled "SEARCH-HIGHLIGHTER SYSTEM AND METHOD,", and naming inventors Bruce Jaffe and Brian Smith. The above-cited application is incorporated herein by reference in its entirety, for all purposes.

FIELD

The present disclosure relates to computing, and more particularly to a search-highlighter-enabled web browser to facilitate performing searches related to selected document elements.

BACKGROUND

A web browser is a software application for retrieving, presenting, and traversing information resources on the World Wide Web ("Web"). An information resource may be a web page, image, video, or other piece of content. Hyperlinks present in resources enable users to easily navigate their browsers to related resources.

Although browsers are primarily intended to access the Web, they can also be used to access information provided by Web servers in private networks or files in file systems. Some browsers can be also used to save information resources to file systems.

Web search engines index information on the Web and provide interfaces by which users can search for indexed information, typically by one or more keywords or search terms. Web searches usually result in a list of results or "hits," which refer to web pages, images, information, and other types of files that are determined to be relevant in some way to the search terms. For the purposes of this disclosure, searchable Web directories, which are typically maintained by human editors, may be considered the equivalent of Web search engines, which typically operate algorithmically (at least in part).

Searching the Web is a common activity. More particularly, it is a common practice for a user to use search terms from one Web page to identify other Web pages that may be related to the search terms. In many cases, such a Web search involves the user copying text or other information and pasting a link into a search box. This practice, however, typically requires some or all of several steps, such as:

(1) highlight the desired text;
(2) perform a copy command;
(3) move the cursor over to the search box either on a page associated with a Uniform Resource Locator ("URL") of a search engine, such as www.google.com (provided by Google Inc. of Menlo Park, Calif.), www.bing.com (provided by Microsoft Corporation of Redmond, Wash.), or the like; or a search box in the toolbar within the browser;
(4) activating the cursor within the search box, typically by using a pointer;
(5) perform a paste command; and
(6) execute a search (typically by activating the "enter" key or clicking on a "search" control).

This repetitive action is cumbersome and slows the process of searching on the web. Many web browsers implement search bar and/or search box functionality, typically via a text-entry field in a browser toolbar area. Web searches are also frequently performed via a search box embedded in a web page. As discussed above, a user could manually select text and paste it into a search bar or other search box.

A number of browser accelerators exist, many of which provide the ability to search terms after they have been highlighted. However, these tools do not let the user edit the search terms prior to executing the search. As a result, a user often ends up performing a first, undesired, search on the selected text, and then editing the search terms before performing a second, desired, search. Moreover, these tools do not let the user automatically search using search terms associated with non-text elements of a document (e.g., images and the like).

DESCRIPTION

Figure 1:
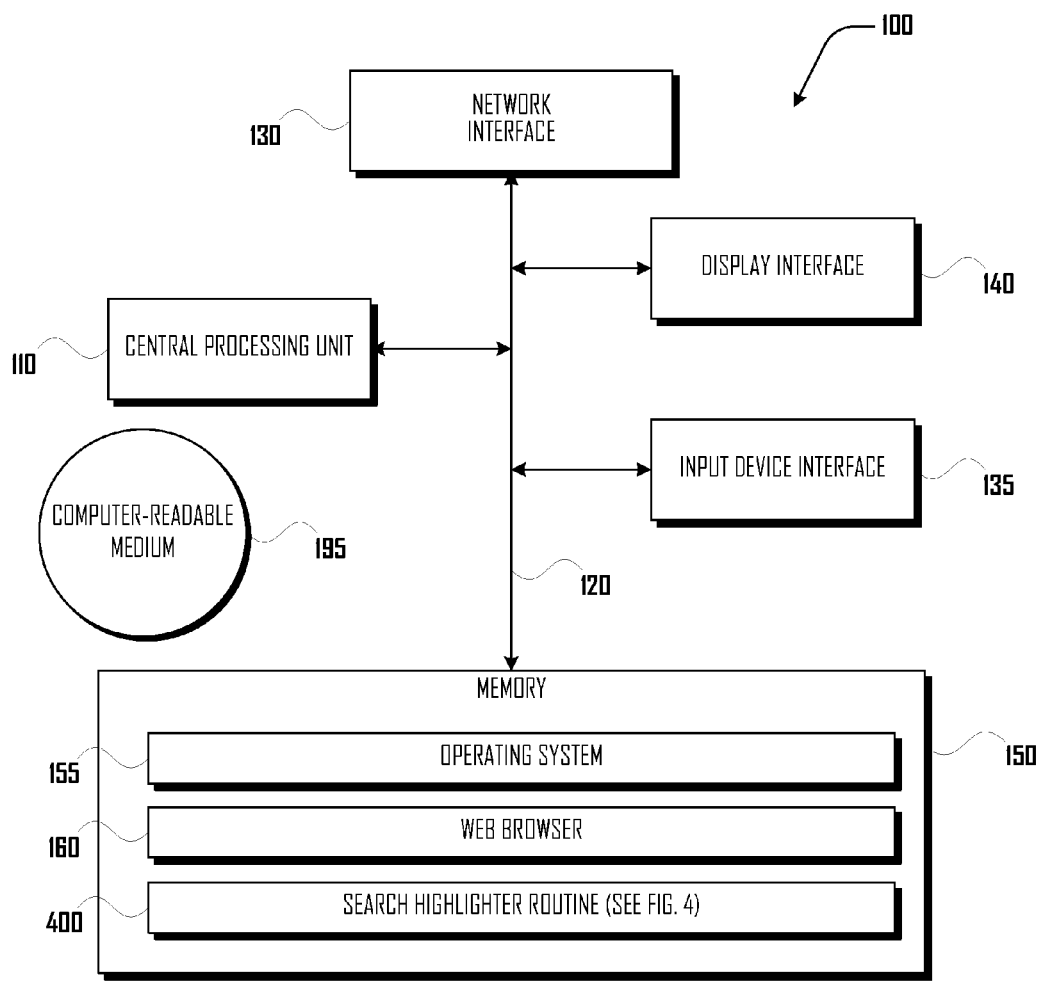
FIG. 1 illustrates a block diagram of a client device in accordance with one embodiment.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications, and equivalents. In alternate embodiments, additional devices, or combinations of illustrated devices, may be added to, or combined, without limiting the scope to the embodiments disclosed herein.

FIG. 1 illustrates several components of an exemplary web-browsing device 100 in accordance with one embodiment. In some embodiments, web-browsing device 100 may include many more components than those shown in FIG. 1. However, it is not necessary that all of these generally conventional components be shown in order to disclose an illustrative embodiment. As shown in FIG. 1, the web-browsing device 100 includes a network interface 130 for connecting to the network 150.

The web-browsing device 100 also includes a processing unit 110, a memory 150, a display interface 140, and an input device interface 145, all interconnected along with the network interface 130 via a bus 120. The memory 150 generally comprises a random access memory ("RAM"), a read only memory ("ROM"), and a permanent mass storage device, such as a disk drive, flash device, or the like. The memory 150 stores program code for a web browser 160, and a search-highlighter routine 400 (see FIG. 4, discussed below). In addition, the memory 150 also stores an operating system 155. These software components may be loaded from a computer readable storage medium 195, on which instructions for executing the software components are tangibly embodied, into memory 150 of the web-browsing device 100 using a read mechanism (not shown) associated with a non-transient computer readable storage medium 195, such as a floppy disc, tape, DVD/CD-ROM drive, memory card, or the like. In some embodiments, software components may also be loaded via the network interface 130, rather than via a computer readable storage medium 195.

Although an exemplary web-browsing device 100 has been described that generally conforms to conventional general purpose computing devices, a web-browsing device 100 may be any of a great number of mobile client devices capable of communicating with the network 150 and obtaining applications, for example, a personal game console, a handheld computer, a cell phone, or any other suitable mobile device. In some embodiments, some or all of the systems and methods disclosed herein may also be applicable to non-mobile client devices, such as a personal computer, a set-top box, television, and the like.

In accordance with various embodiments, a search-highlighter routine may provide the user with a streamlined method of identifying and editing a text string to be used as a web query. In particular, in one embodiment, a search-highlighter routine may detect an information selection event and in response, automatically enter the selected information into a search box. In many embodiments, a user can edit the search terms in the search box before executing a search.

From a user's perspective, a search-highlighter-enabled browser may let the user place a text string into a web-search text-entry field simply by highlighting desired search terms in the text of a displayed web page. When the desired search elements are highlighted, the search-highlighter routine automatically captures text associated with the selection and places it automatically into a web-search text-entry field of the web browser. In some embodiments, the user may then modify the search terms in the web-search text-entry field prior to executing the search (typically by activating the "enter" key or a "search" control, e.g. via a pointer device).

In some embodiments, a search-highlighter routine may be implemented as a browser extension, which may be installed in a web browser by the user, thereby search-highlighter-enabling the web browser. Browser extensions allow developers to supplement the functionality made available to users of browsers such as Internet Explorer, provided by Microsoft Corporation of Redmond, Wash.; Firefox, provided by the Mozilla Foundation of Mountain View, Calif.; Safari, provided by Apple Inc. of Cupertino, Calif.; Google Chrome, provided by Google Inc. of Menlo Park, Calif.; Opera, provided by Opera Software ASA of Oslo, Norway; and the like. As the term is used herein, "browser extension" may refer in various embodiments to an add-in, a plug-in, an extension, or a like functionality-supplementing object.

In some embodiments, a search-highlighter routine may also be integrated into the core browser code and/or enabled by a publisher on the website or an application developer within an application, eliminating the need for the user to install a separate extension.

Figure 2:
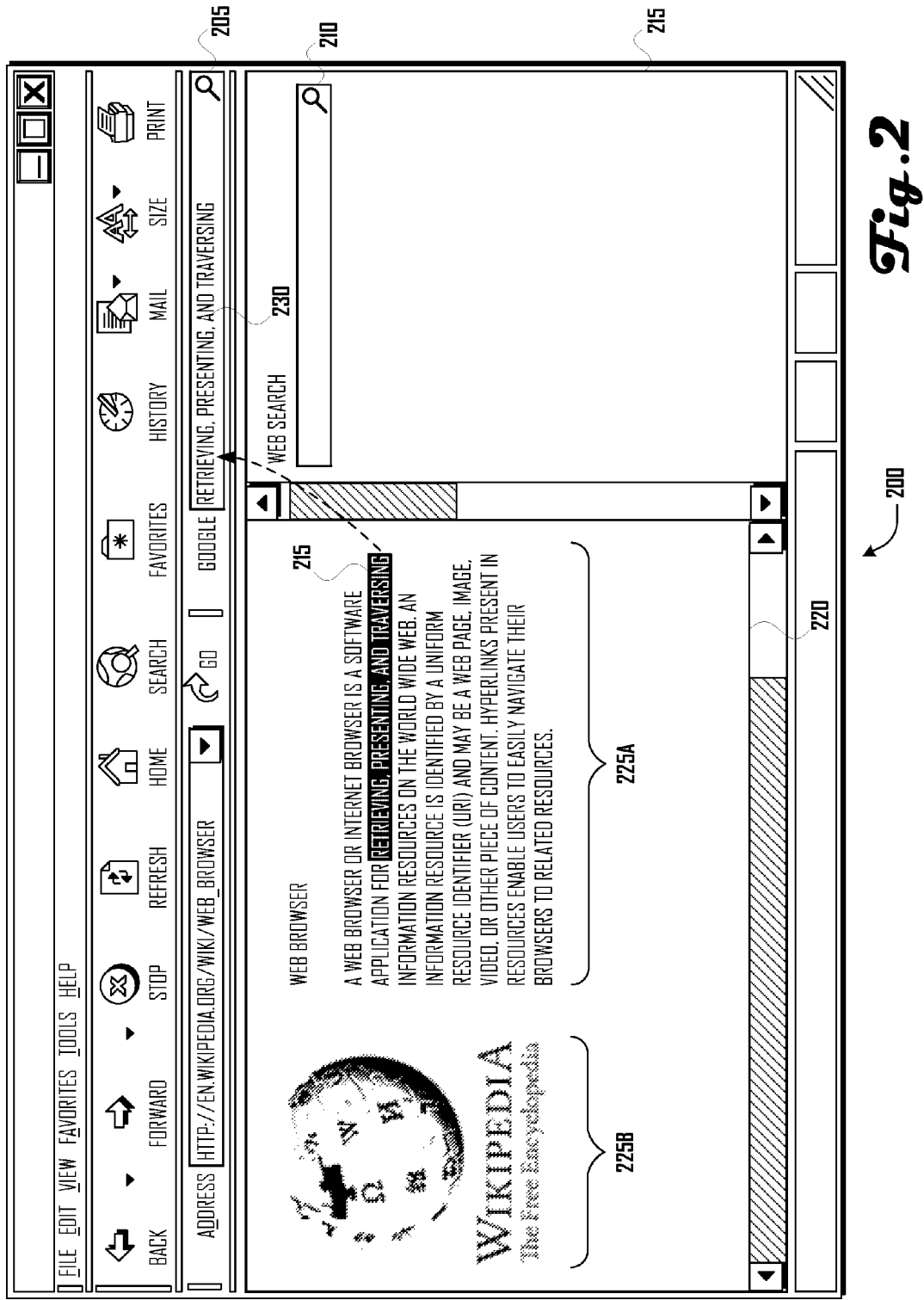
FIGS. 2-3 illustrate a search-highlighter-enabled web browser window in accordance with one embodiment.
Figure 3:
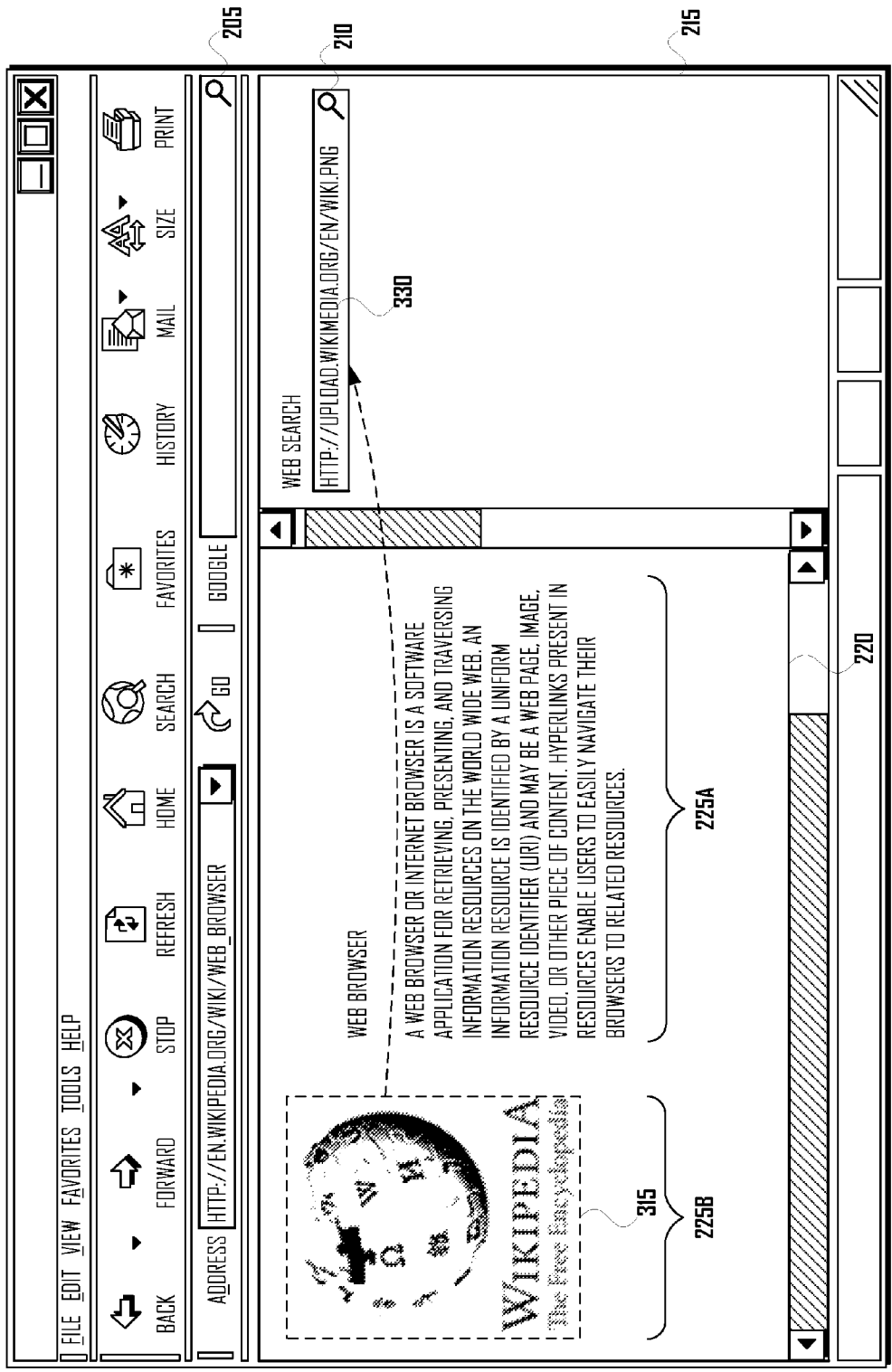

FIGS. 2-3 illustrate a search-highlighter-enabled web browser window 200 including a "built-in" web-search editable text entry field 205, as well as browser-extension provided web-search editable text entry field 210 in sidebar 215, in accordance with one embodiment. Web browser window 200 also includes a web display area 220, in which renderable textual data 225A and renderable non-textual data 225B are rendered.

FIG. 2, illustrates a text selection 215, such as may have been made by a user of the web browser. FIG. 2 also illustrates a copy 230 of selected text 215 having been automatically placed into web-search editable text entry field 205 by a search-highlighter routine such as routine 400 (see FIG. 4, discussed below). In other embodiments, a copy of selected text 215 may be placed into web-search editable text entry field 210 (not shown) instead of or in addition to web-search editable text entry field 205.

In some embodiments, in addition to working with selections of text, the search-highlighter can capture a text string associated with a selected non-textual element. For example, FIG. 3, illustrates a selection 315 of non-textual renderable data 225B (here, an image) within web display area 220 of search-highlighter-enabled web browser window 200. FIG. 3 also illustrates a text string 330 corresponding to non-text selection 315 (here, a URL corresponding to the selected image) having been automatically placed into web-search editable text entry field 210 by a search-highlighter routine such as routine 400 (see FIG. 4, discussed below). In other embodiments, a text string corresponding to non-text selection 315 may be placed into web-search editable text entry field 205 (not shown) instead of or in addition to web-search editable text entry field 210. In other embodiments, instead of placing a URL corresponding to a selected image, another text string associated with a selected image (e.g., an alternate-text attribute, such as the "alt" attribute used in HyperText Markup Language or "HTML") may be placed into web-search editable text entry field 205 (not shown).

In still other embodiments, the search-highlighter may capture a meta-data text string corresponding to selected non-textual elements other than images. For example, in one embodiment, when a browser tab, window, or page is selected, the search highlighter may capture the page title or other header meta-data. In another embodiment, when a combo-box, list box, drop-down list, or other like graphical user interface ("GUI") control is selected, the search highlighter may capture a text string corresponding to the selected list item, or alternately, the search highlighter may capture a text string corresponding to some or all of the list items available from the selected GUI control.

Figure 4:
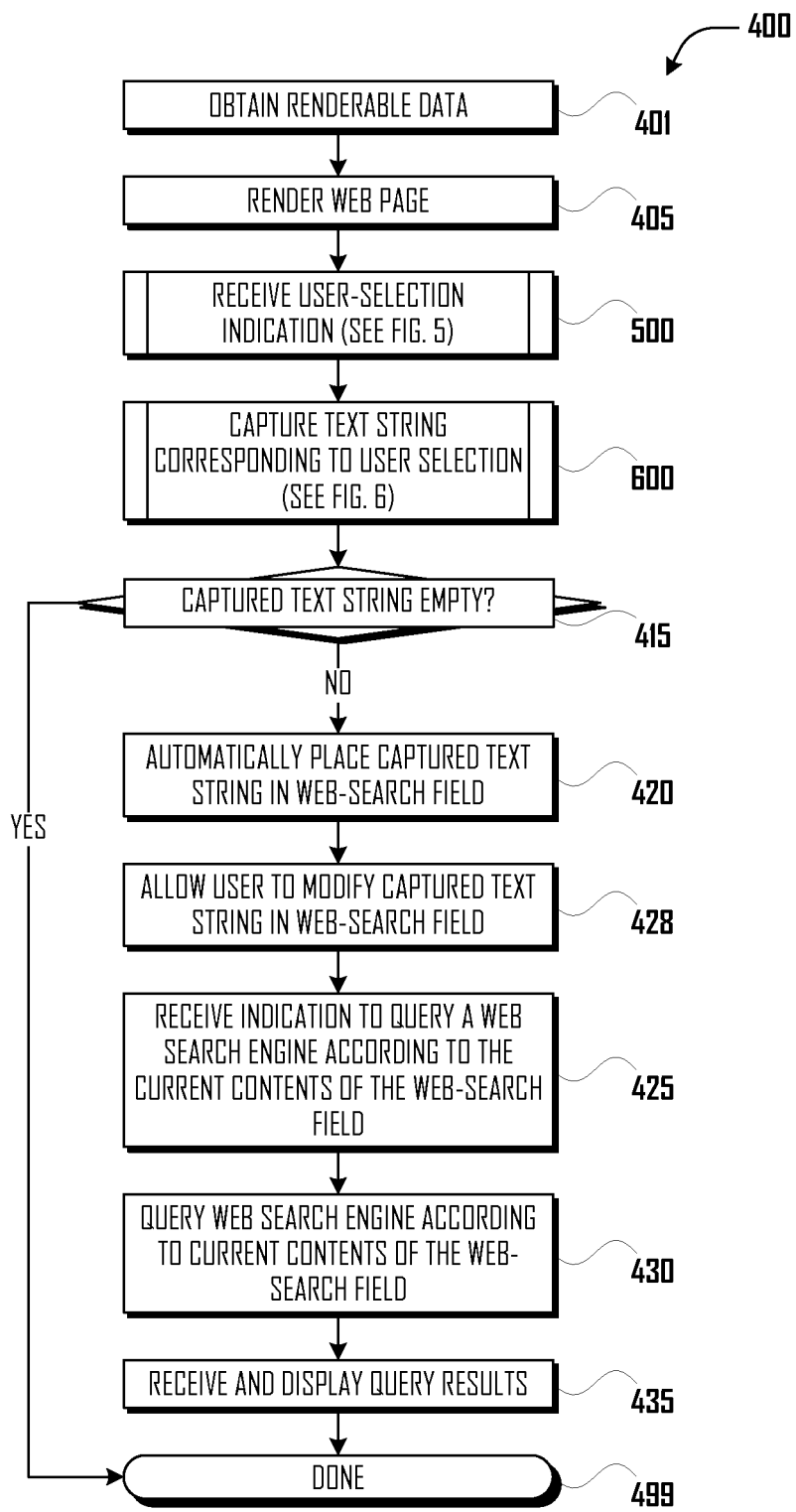
FIG. 4 illustrates a search-highlighter routine, such as may be performed by a web browser executing on a computing device in accordance with one embodiment.

FIG. 4 illustrates a search-highlighter routine 400, such as may be performed by a web browser executing on a computing device (e.g., device 100) in accordance with one embodiment. In various embodiments, routine 400 may be implemented in the web browser either via a browser extension or by the web browser itself. In some embodiments, some or all of routine 400 (as well as subroutines 500 and 600) may be implemented via one or more JavaScript files executed in connection with the current session of the web browser. The web browser also implements at least one web-search editable text entry field, via a browser extension and/or by the web browser itself In block 401, routine 400 obtains renderable data corresponding to a web page, such as may be included within a HyperText Markup Language ("HTML") document or other type of document that the web browser is capable of rendering. In various embodiments, the renderable data may be obtained from a local or remote file.

In block 405, routine 400 renders the web page according to the renderable data obtained in block 401.

In subroutine block 500 (see FIG. 5, discussed below), routine 400 receives an indication that a user of the web browser has selected a portion of the renderable data rendered to the web page (e.g., a portion of text and/or one or more non-textual elements such as images or the like).

In subroutine block 600 (see FIG. 6, discussed below), routine 400 captures a text string corresponding to the user selection. For example, in various embodiments, routine 400 may capture a text string that was selected by the user and/or textual meta-data associated with a non-textual element that was selected by the user.

In decision block 415, routine 400 determines whether the captured text string is empty. If so, then routine 400 skips to ending block 499.

However, if the captured string is non-empty, then in block 420, with no further instructions or actions of the user, routine 400 automatically places the captured text string into a web-search editable text entry field of the web browser.

In block 428, routine 400 allows the user the opportunity to modify the captured text string after it has been placed into the web-search editable text entry field. For example, in one embodiment, the user may, using a text entry input device and/or a pointing device, add, edit, and/or delete text from the captured text string.

Once the user has had the opportunity to modify the captured text string, in block 425, routine 400 receives an indication to query a web search engine according to the current text contents of the web-search editable text entry field (which may have been modified by the user in block 428).

In block 430, routine 400 queries a web search engine according to the current text contents of the web-search editable text entry field. And in block 435, routine 400 receives and displays one or more query results from the web search engine. Routine 400 ends in block 499.

Figure 5:
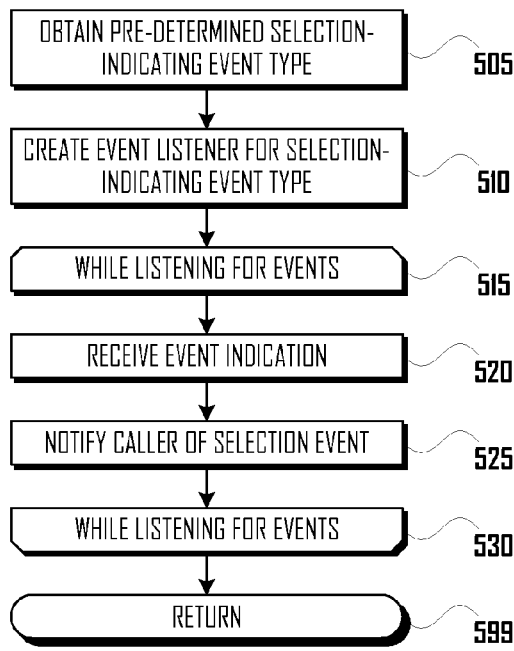
FIG. 5 illustrates a subroutine for receiving a user-selection indication, in accordance with one embodiment.

FIG. 5 illustrates a subroutine 500 for receiving a user-selection indication, in accordance with one embodiment.

In block 505, subroutine 500 obtains at least one pre-determined type of event that at least potentially indicates that a user of a web browser has made a selection of rendered data in the web browser. For example, in one embodiment, subroutine 500 may obtain at least one of a "mouseup" event, an "enter" event, or other suitable event.

In block 510, subroutine 500 creates an event listener to receive events corresponding to the at least one pre-determined type of selection-indicating event. For example, in one embodiment, subroutine 500 may add an "eventListener" to the active tab and/or window in the web browser via executable JavaScript code.

From opening loop block 515 to closing loop block 530, subroutine 500 "listens" for events, periodically processing event notifications from the web browser and/or the operating system of the device on which the web browser is executing.

When a selection-indicating event occurs, subroutine 500 receives an indication of the event in block 520, notifies the calling routine (e.g., routine 400) that such an event has occurred in block 525, and iterates from block 530 back to block 515 to listen for further events.

After subroutine 500 stops listening for events, subroutine 500 ends in block 599.

Figure 6:
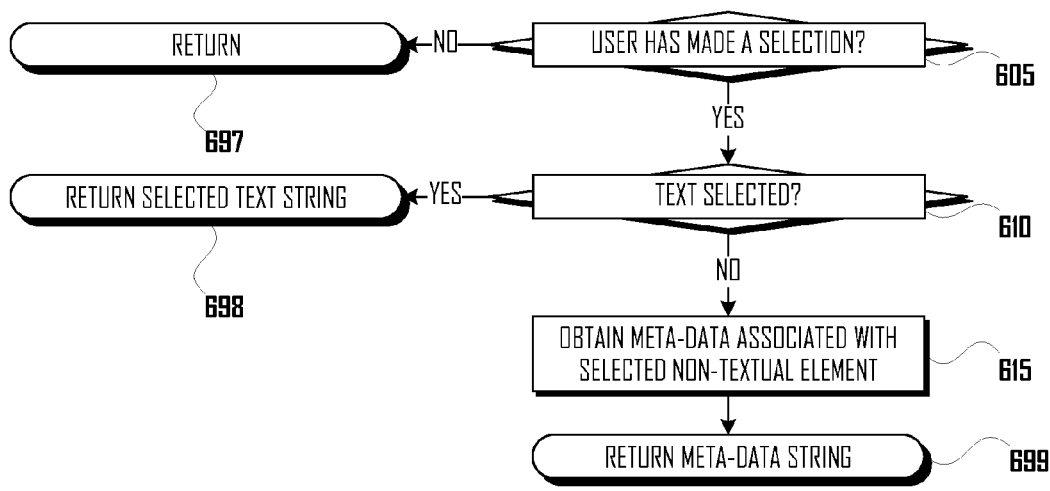
FIG. 6 illustrates a subroutine for capturing a text string corresponding to a user selection, in accordance with one embodiment.

FIG. 6 illustrates a subroutine 600 for capturing a text string corresponding to a user selection, in accordance with one embodiment. In decision block 605, subroutine 600 determines whether the user has made a selection of rendered data in the active tab and/or window in the web browser. For example, in one embodiment, subroutine 600 may call the content DOM object's "getSelection" method to determine whether the user has selected text or other rendered data. If there is no active selection in the active tab and/or window, then subroutine 600 ends in block 697, returning nothing, nil, the empty string, or the like.

On the other hand, if there is an active selection, then in decision block 610, subroutine 600 determines whether the user has made a selection of rendered text. If so, then subroutine 600 ends in block 698, returning the selected text string to the caller (e.g., routine 400).

Otherwise, if the user has made a selection of a non-textual element rendered in the web browser (e.g., the user has selected a rendered image, the rendered page, a rendered GUI control, or the like), then in block 615, subroutine 600 obtains a meta-data string associated with the selected non-textual element. For example, in one embodiment, subroutine 600 may obtain an alternate-text attribute string (if any) associated with the non-textual element, such as an HTML "alt" attribute string. In other embodiments, subroutine 600 may obtain different metadata, such as a URL and/or Uniform Resource Identifier ("URI") corresponding to the selected non-textual element, a page title or other tagged header metadata associated with the selected non-textual element (e.g., when the selected element is a browser tab, window, page, or the like), one or more list items or list options associated with the selected non-textual element (e.g., when the selected non-textual element is a GUI control that presents one or more options).

In block 699, subroutine 600 ends, returning the meta-data string to the caller.

Although specific embodiments have been illustrated and described herein, it will be appreciated by those of ordinary skill in the art that a whole variety of alternate and/or equivalent implementations may be substituted for the specific embodiments shown and described without departing from the scope of the present disclosure. This application is intended to cover any adaptations or variations of the embodiments discussed herein.

What is claimed is:

1. A computer-implemented method for facilitating web-searches in a web browser having a web-search text-entry field, the method comprising:
   rendering, by the computer, a web page in the web browser, said web page comprising renderable data;
   receiving, by the computer, an indication that a user of the computer has made a user-selection of a portion of said renderable data;
   in response to receiving said indication:
      capturing, by the computer, a text string corresponding to said user-selection; and
      automatically placing, by the computer, said text string in the web-search text-entry field of the web browser without further instructions from said user; and
   subsequent to placing said text string in the web-search text-entry field of the web browser:
      receiving a second indication that said user has modified said text string in the web-search text-entry field of the web browser; and
      only after receiving said second indication, querying a web-search engine according to the modified text string.

2. The method of claim 1 wherein receiving said indication that said user has made said user-selection comprises:
   determining a pre-defined selection-indicating event-type implemented by the web browser; and
   creating an event-listener to continually receive indications of user actions corresponding to said selection-indicating event-type.

3. The method of claim 1, wherein said user-selection comprises a selection of text of said renderable data, and wherein said text string corresponding to said user-selection consists of said selection of text.

4. The method of claim 1, wherein said user-selection comprises a non-textual element of said renderable data, and wherein said text string corresponding to said user-selection comprises textual meta-data associated with said non-textual element.

5. The method of claim 4, wherein said textual meta-data comprises a Uniform Resource Identifier ("URI") corresponding to said non-textual element.

6. The method of claim 4, wherein said textual meta-data comprises an alternate-text attribute corresponding to said non-textual element.

7. The method of claim 4, wherein said non-textual element comprises an image element of said renderable data.

8. A non-transitory computer-readable storage medium having stored thereon instructions that, when executed by a processor, configure the processor to perform a method for facilitating web-searches in a web browser having a web-search text-entry field, the method comprising:
- rendering a web page in the web browser, said web page comprising renderable data
- receiving an indication that a user of the web browser has made a user-selection of a portion of said renderable data
- in response to receiving said indication:
  - capturing a text string corresponding to said user-selection; and
  - automatically placing said text string in the web-search text-entry field of the web browser without further instructions from said user; and
- subsequent to placing said text string in the web-search text-entry field of the web browser:
  - receiving a second indication that said user has modified said text string in the web-search text-entry field of the web browser; and
  - only after receiving said second indication, querying a web-search engine according to the modified text string.

9. The storage medium of claim 8, wherein receiving said indication that said user has made said user-selection comprises:
- determining a pre-defined selection-indicating event-type implemented by the web browser; and
- creating an event-listener to continually receive indications of user actions corresponding to said selection-indicating event-type.

10. The storage medium of claim 8, wherein said user-selection comprises a selection of text of said renderable data, and wherein said text string corresponding to said user-selection consists of said selection of text.

11. The storage medium of claim 8, wherein said user-selection comprises a non-textual element of said renderable data, and wherein said text string corresponding to said user-selection comprises textual meta-data associated with said non-textual element.

12. The storage medium of claim 11, wherein said textual meta-data comprises a Uniform Resource Identifier ("URI") corresponding to said non-textual element.

13. The storage medium of claim 11, wherein said textual meta-data comprises an alternate-text attribute corresponding to said non-textual element.

14. The storage medium of claim 11, wherein said non-textual element comprises an image element of said renderable data.

15. A computing apparatus comprising a processor and a memory storing instructions that, when executed by the processor, configure the apparatus to perform a method for facilitating web-searches in a web browser having a web-search text-entry field, the method comprising:
- rendering a web page in the web browser, said web page comprising renderable data;
- receiving an indication that a user of the web browser has made a user-selection of a portion of said renderable data;
- in response to receiving said indication:
  - capturing a text string corresponding to said user-selection; and
  - automatically placing said text string in the web-search text-entry field of the web browser without further instructions from said user; and
- subsequent to placing said text string in the web-search text-entry field of the web browser:
  - receiving a second indication that said user has modified said text string in the web-search text-entry field of the web browser; and
  - only after receiving said second indication, querying a web-search engine according to the modified text string.

16. The apparatus of claim 15, wherein receiving said indication that said user has made said user-selection comprises:
- determining a pre-defined selection-indicating event-type implemented by the web browser; and
- creating an event-listener to continually receive indications of user actions corresponding to said selection-indicating event-type.

17. The apparatus of claim 15, wherein said user-selection comprises a selection of text of said renderable data, and wherein said text string corresponding to said user-selection consists of said selection of text.

18. The apparatus of claim 15, wherein said user-selection comprises a non-textual element of said renderable data, and wherein said text string corresponding to said user-selection comprises textual meta-data associated with said non-textual element.

19. The apparatus of claim 18, wherein said textual meta-data comprises a Uniform Resource Identifier ("URI") corresponding to said non-textual element.

20. The apparatus of claim 18, wherein said textual meta-data comprises an alternate-text attribute corresponding to said non-textual element.

21. The apparatus of claim 18, wherein said non-textual element comprises an image element of said renderable data.

* * * * *